United States Patent
Kim et al.

(10) Patent No.: US 7,675,941 B2
(45) Date of Patent: Mar. 9, 2010

(54) METHOD AND APPARATUS FOR TRANSMITTING/RECEIVING PACKET DATA USING PRE-DEFINED LENGTH INDICATOR IN A MOBILE COMMUNICATION SYSTEM

(75) Inventors: Soeng-Hun Kim, Suwon-si (KR); Gert-Jan Van Lieshout, Middlesex (GB); Himke Van Der Velde, Middlesex (GB)

(73) Assignee: Samsung Electronics Co., Ltd., Suwon-Si (KR)

( * ) Notice: Subject to any disclaimer, the term of this patent is extended or adjusted under 35 U.S.C. 154(b) by 908 days.

(21) Appl. No.: 11/417,219

(22) Filed: May 4, 2006

(65) Prior Publication Data
US 2007/0060139 A1    Mar. 15, 2007

(30) Foreign Application Priority Data
May 4, 2005    (KR) .................. 10-2005-0037774

(51) Int. Cl.
*H04J 3/00*    (2006.01)
(52) U.S. Cl. .................. 370/473; 370/474; 370/329
(58) Field of Classification Search .................. 370/281, 370/295, 344, 252, 349, 470, 474, 469
See application file for complete search history.

(56) References Cited

U.S. PATENT DOCUMENTS

| | | | |
|---|---|---|---|
| 2002/0001314 A1* | 1/2002 | Yi et al. ............ | 370/469 |
| 2002/0024972 A1 | 2/2002 | Yi et al. | |
| 2002/0041567 A1 | 4/2002 | Yi et al. | |
| 2002/0048281 A1 | 4/2002 | Yi et al. | |
| 2002/0174276 A1* | 11/2002 | Jiang ............ | 710/105 |
| 2004/0160937 A1* | 8/2004 | Jiang ............ | 370/349 |
| 2006/0072494 A1* | 4/2006 | Matusz ............ | 370/328 |

FOREIGN PATENT DOCUMENTS

| | | |
|---|---|---|
| EP | 1 276 282 A | 1/2003 |
| RU | 2204215 | 5/2003 |
| WO | WO 00/21253 | 4/2000 |
| WO | WO021253 | 4/2000 |

OTHER PUBLICATIONS

"Universal Mobile Telecommunications System (UMTS); Radio Link Control (RLC) protocol specification (3GPP TS 25.322 version 6.3.0 Release 6); ETSI TS 125 322" ETSI Standards, European Telecommunications Standards Institute, Sophia-Antipo, FR, vol. 3-R2, No. V630, Mar. 2005, XP014027660; ISSN: 0000-0001; sections 11.1.2.2 and 11.2.2.2.

* cited by examiner

*Primary Examiner*—Ricky Ngo
*Assistant Examiner*—David Oveissi
(74) *Attorney, Agent, or Firm*—Roylance, Abrams, Berdo & Goodman, LLP (57) ABSTRACT

A method and apparatus for enabling efficient use of radio resources by reducing an RLC PDU size in a mobile communication system supporting voice service over a packet network are provided. An RLC layer constructs an RLC PDU without inserting information indicating the start and end of an SDU or indicating the use or non-use of padding. The RLC layer sets an LI in a header to indicate inclusion of an intermediate SDU segment in the data field of the RLC PDU. Therefore, the resulting decrease of overhead arising from packet transmission facilitates the efficient use of limited radio resources.

18 Claims, 9 Drawing Sheets

METHOD AND APPARATUS FOR TRANSMITTING/RECEIVING PACKET DATA USING PRE-DEFINED LENGTH INDICATOR IN A MOBILE COMMUNICATION SYSTEM

PRIORITY

This application claims the benefit 35 U.S.C. § 119(a) of Korean Patent Application filed in the Korean Intellectual Property Office on May 4, 2005 and assigned Serial No. 2005-37774, the entire disclosure of which is hereby incorporated by reference.

BACKGROUND OF THE INVENTION

1. Field of the Invention

The present invention relates generally to a mobile communication system supporting packet service. More particularly, the present invention relates to a method and apparatus which efficiently use radio resources by reducing the header size of a Protocol Data Unit (PDU) to be transmitted on a radio link.

2. Description of the Related Art

Today's mobile communication systems are evolving toward high-speed and high-quality wireless data packet communication systems. These systems are capable of providing data service and multimedia service in addition to the traditional voice service. A 3rd generation mobile communication system using Wideband Code Division Multiple Access (WCDMA) based on the European Global System for Mobile communications (GSM) system and General Packet Radio Services (GPRS), Universal Mobile Telecommunication Service (UMTS) provides mobile subscribers or computer users with a uniform service of transmitting packet-based text, digitized voice, and video and multimedia data at or above 2 Mbps regardless of their locations around the world. With the introduction of the concept of virtual access, the UMTS system allows access to any end point within a network all the time. The virtual access refers to packet-switched access using a packet protocol like Internet Protocol (IP).

Regarding voice service, a standardization organization for UMTS, 3rd Generation Partnership Project (3GPP) is discussing Voice over IP (VoIP). VoIP is a technology for sending a voice frame generated from an audio Coder and Decoder (CODEC) in the form of an IP/User Datagram Protocol (UDP)/Real-time Transport Protocol (RTP) packet. VoIP facilitates the provision of voice service over a packet network.

Figure 1:
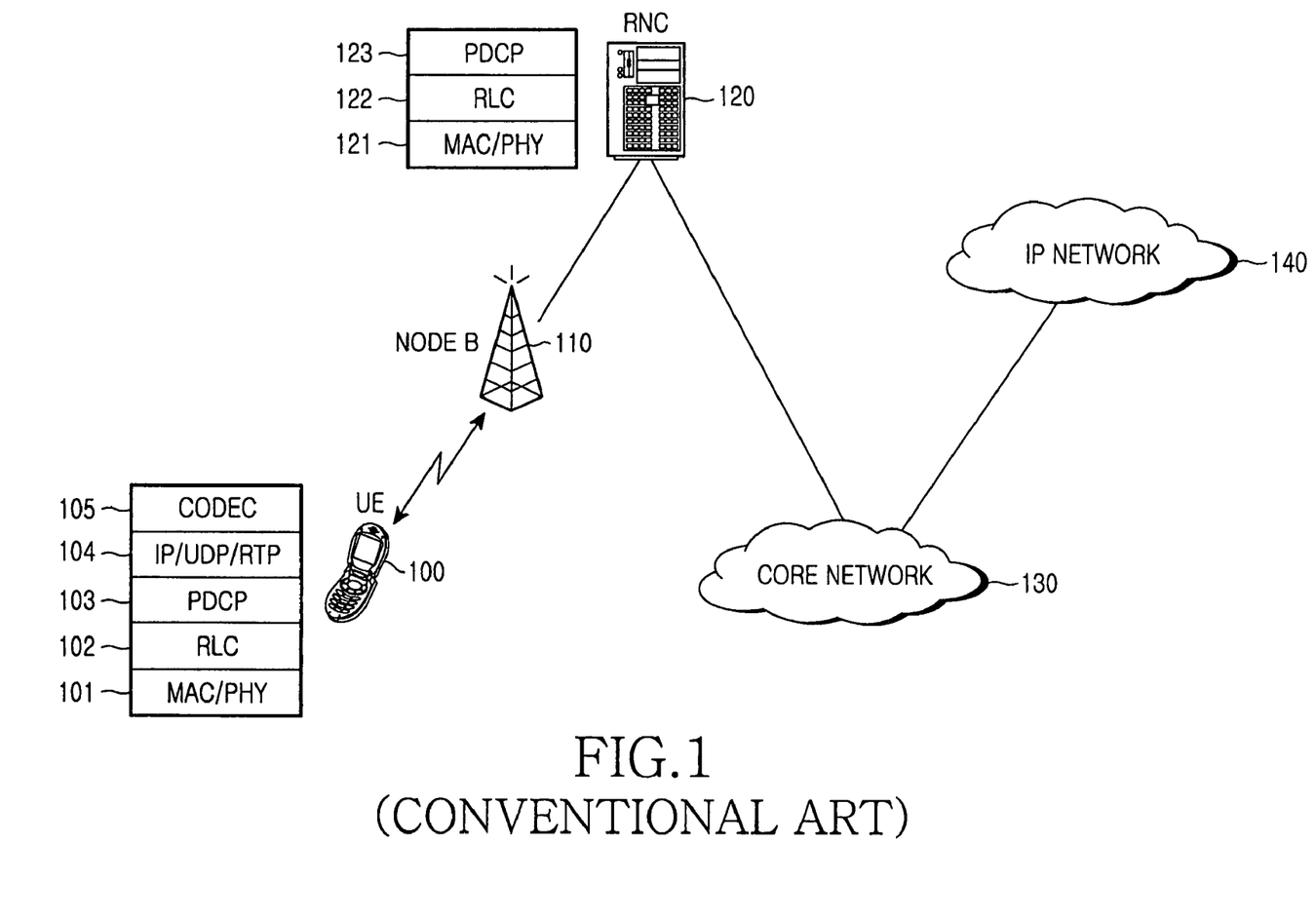
FIG. 1 illustrates the configuration of a conventional mobile communication system supporting VoIP.

FIG. 1 illustrates the configuration of a typical mobile communication system supporting VoIP.

Referring to FIG. 1, a User Equipment (UE) 100 includes a CODEC 105 for converting a voice signal to a voice frame, an IP/UDP/RTP layer 104 for converting the voice frame to an IP/UDP/RTP frame, a Packet Data Convergence Protocol (PDCP) layer 103 for compressing the header of the IP/UDP/RTP packet, a Radio Link Control (RLC) layer 102 for converting the header-compressed IP/UDP/RTP packet to be suitable for transmission on a radio channel, and a Medium Access Control (MAC)/Physical (PHY) layer 101 for sending the output of the RLC layer 102 on the radio channel.

Radio data from the UE 100 is delivered to a Radio Network Controller (RNC) 120 via the PHY layer (not shown) of a Node B 110 on the radio channel. Like the UE 100, the RNC 120 is analogous to the UE 100 because it includes a MAC layer 121, an RLC layer 122, and a PDCP layer 123, for converting the radio data to the original IP/UDP/RTP packet and sending it to a Core Network (CN) 130. The IP/UDP/RTP packet is sent to the other party, for example, a receiving UE (not shown) via an IP network 140. The receiving UE a layer structure analogous to that of the transmitting UE 100 and recovers the original voice signal by processing the IP/UDP/RTP packet in the reverse order. The RLC layers 102 and 122 function as follows.

In general, the RLC layer works in Unacknowledged Mode (UM), Acknowledged Mode (AM), or Transparent Mode (TM). VoIP operates in the RLC UM.

In the transmitter, the RLC UM layer segments, concatenates, or pads RLC Service Data Units (SDUs) received from a higher layer to a size suitable for transmission on a radio channel. The RLC UM layer constructs an RLC PDU suitable for transmission on the radio channel by inserting segmentation/concatenation/padding information and a sequence number into the resulting data and provides the RLC PDU to a lower layer.

In the receiver, the RLC UM layer recovers data by interpreting the sequence number and segmentation/concatenation/padding information of an RLC PDU received from a lower layer and re-constructs an RLC SDU by concatenating or segmenting the data, in correspondence with the operation of the transmitter. The reconstructed RLC SDU is provided to a higher layer. Processing an RLC SDU received from the higher layer to a size suitable for transmission on a radio channel is called 'RLC framing'.

Figure 2A:
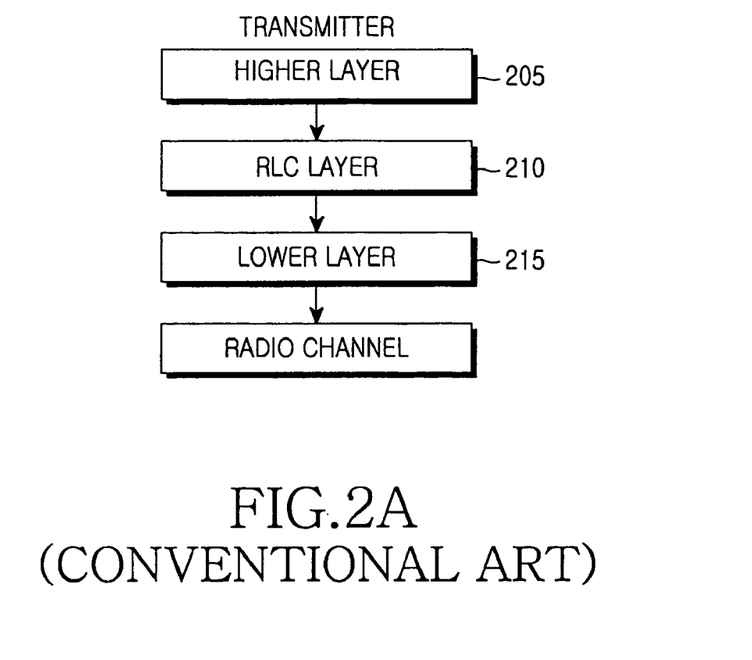
FIG. 2A illustrates a conventional transmission operation.

FIG. 2A illustrates conventional RLC framing in a transmitter.

In FIG. 2, an RLC layer 210 frames data received from a higher layer 205 to a suitable data size for transmission on a radio channel. A lower layer 215 sends the framed data to a receiver on the radio channel. The higher layer 205 corresponds to a PDCP layer and the lower layer 215 corresponds to a MAC layer. The data exchanged between the RLC layer 210 and the higher layer 205 is an 'RLC SDU' and the data exchanged between the RLC layer 210 and the lower layer 215 is an 'RLC PDU'.

Figure 2B:
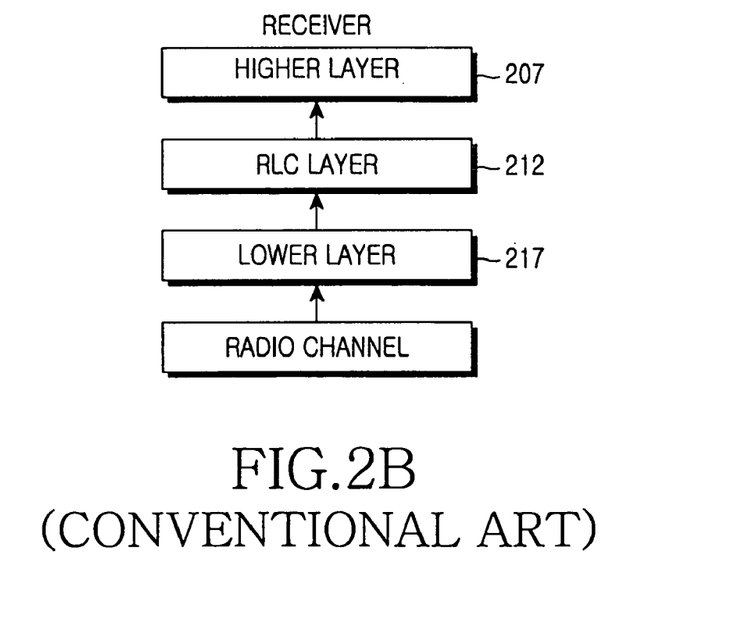
FIG. 2B illustrates a conventional reception operation.

FIG. 2B illustrates conventional RLC framing in a receiver.

Referring to FIG. 2B, an RLC layer 212 recovers the original data from data received from a lower layer 217 and provides the recovered data to a higher layer 207. The higher layer 207 corresponds to a PDCP layer and the lower layer 217 corresponds to a MAC layer. The data exchanged between the RLC layer 212 and the higher layer 207 is an 'RLC SDU' and the data exchanged between the RLC layer 212 and the lower layer 217 is an 'RLC PDU'.

Figure 2C:
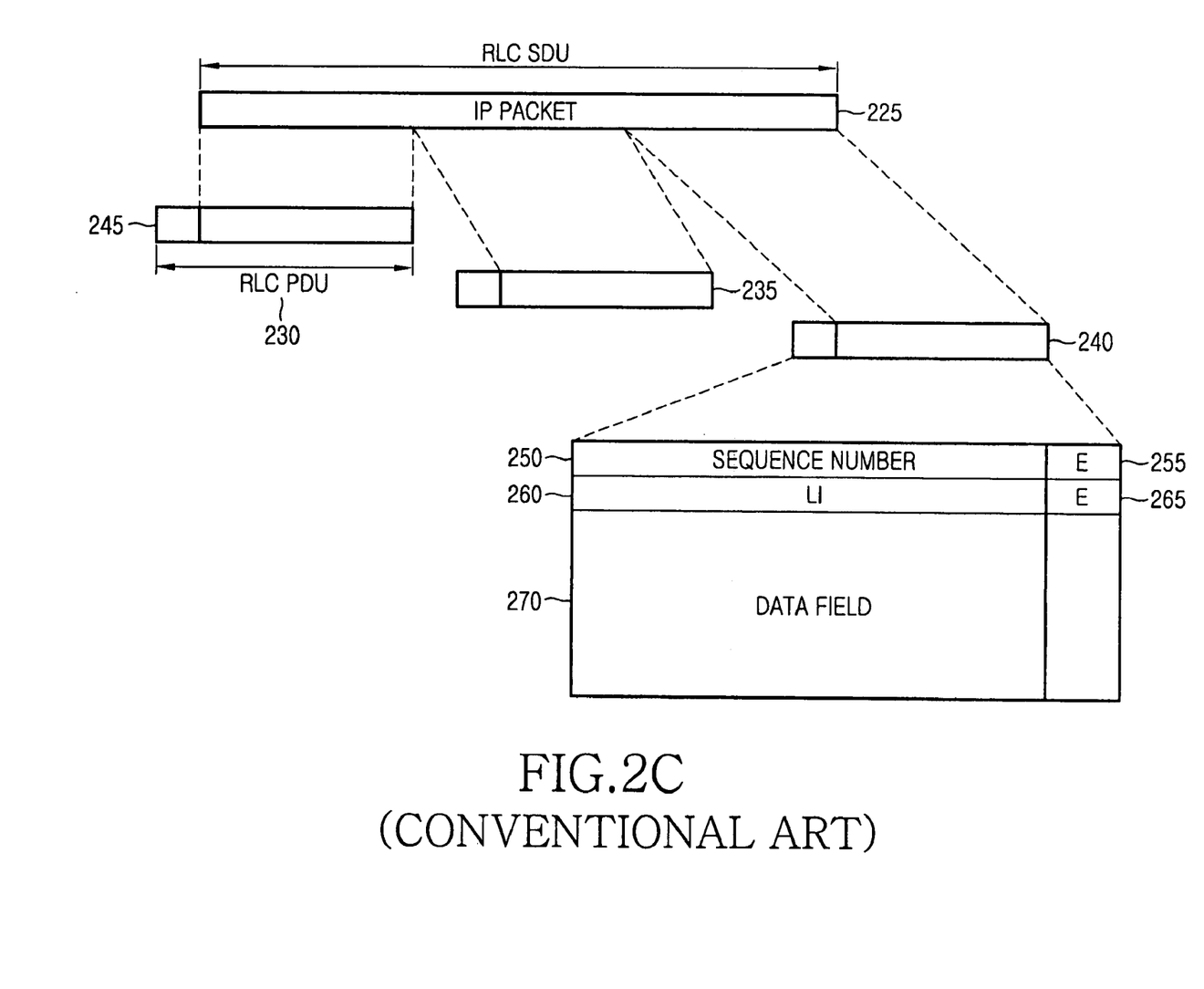
FIG. 2C illustrates a conventional operation of constructing RLC PDUs with an RLC SDU by RLC framing in a transmitter.

FIG. 2C illustrates a conventional operation for constructing RLC PDUs by framing of RLC SDUs in the RLC layer of the transmitter.

With reference to FIG. 2C, the RLC layer of the transmitter receives an RLC SDU 225 of a particular size, for example, a 100-byte IP packet from the higher layer. If a data size transmittable on a radio channel is 40 bytes, the RLC layer segments the RLC SDU 225 into three RLC PDUs 230, 235 and 240. Each RLC PDU may have 40 bytes. Each RLC PDU also includes an RLC header 245.

The RLC header 245 includes a Sequence Number (SN) 250, an E field 255, and at least one of a plurality of pairs of Length Indicator (LI) field 260 and E field 265. The LI field 260 is included according to segmentation. The SN field 250 indicates a 7-bit SN which increases monotonously by 1 for every RLC PDU. SNs indicate the sequence of the RLC PDUs 230, 235 and 240. The E field 255, which is one bit, indicates whether the following field is a Data field or an LI-E pair field.

The LI field 260 is 7 bits or 15 bits in size depending on RLC framing. It indicates the position of a segment of the RLC SDU 225 in a Data field 270 of the RLC PDU. The LI field 260 indicates the start and end of the RLC SDU 225 within the Data field 270 of the RLC PDU. The LI field 260 may also indicate whether padding is used. The LI field 260 is set to a value expressed in bytes, indicating the number of bytes to the end of an RLC SDU from an RLC header. For simplicity, the LI field 260 is assumed to be 7 bits.

In the first byte of the first RLC PDU 230, the SN is set to a predetermined value 'x' and the first E is set to '1', which implies that an LI-E pair resides in the following byte. In the second byte of the RLC PDU 230, the LI field indicates that the RLC SDU 225 starts from the first byte of the Data field of the RLC PDU 230. This allows the LI field to be used in other ways rather than just indicating the position of the last byte of the RLC SDU. This LI is called 'pre-defined LI'. Pre-defined LIs are discussed below.

'1111 100': the first byte of the Data field in the RLC PDU is the first byte of the RLC SDU.

'0000 000': although the last byte of the RLC SDU is included in the previous RLC PDU, an LI indicating that it is not included in the previous RLC PDU.

'1111 111': the remainder of the Data field of the RLC PDU are padding bits.

Hence, the first LI field is set to the pre-defined LI '1111 100' and '0' is inserted in the second E field to indicate that the next byte belongs to the Data field in the RLC PDU 230. Accordingly, a 38-byte Data field of the 40-byte RLC PDU 230, except for the first two bytes, is used to carry the first 38 bytes of the RLC SDU 225.

In the second RLC PDU 235, the SN is set to 'x+1' and the E is set to '0' indicating that the next byte is for the Data in the first byte. Since the RLC PDU 235 does not include the first byte or the last byte of the RLC SDU 225, there is no need to include an LI field. Therefore, the remaining 39 bytes of the Data field carry 39 bytes of the RLC SDU 225, from byte 39 to byte 77.

In the third RLC PDU 240, the SN is set to 'x+2' and the E is set to '1' indicating that the next byte is an LI-E pair in the first byte. In the second byte, the LI is set to '0010 111(=23)' indicating that the last byte of the RLC SDU 225 corresponds to the 23th byte ('100'–'77') of the Data field, and the E field is set to '1'. The Data field of the RLC PDU 240 still has room to carry data, after loading the last segment of the 100-byte RLC SDU 225. Therefore, the second E field is set to '1' and the second LI field is set to '1111 111', which implies that bits following the position indicated by the first LI field are padded. The third E field is set to '0'. Consequently, the Data field of the RLC PDU 240 is filled with the last 23 bytes of the RLC SDU 225 and a 14-byte padding.

In accordance with the above RLC layer operation of the transmitter, the RLC layer of the receiver operates as follows.

The RLC layer of the receiver receives the RLC PDUs 230, 235 and 240 and sequentially orders them based on their SNs. Specifically, the RLC layer determines that the Data field of the first RLC PDU 230 corresponds to the first segment of the RLC SDU 225 referring to the LI field of the RLC PDU 230, and the Data field of the second RLC PDU 235 corresponds to the second segment of the RLC SDU 225 referring to the LI field of the RLC PDU 235, thus considering that reconstruction of the RLC SDU 235 is yet to be completed. Then the RLC layer determines from the first LI field of the RLC PDU 240 that 23 bytes of the Data field of the RLC PDU 240 are the last segment of the RLC SDU 225, and completes reconstruction of the RLC SDU 225 by combining the segments extracted from the three RLC PDUs 230, 235 and 240. In this process, the RLC layer recognizes from the second LI that the remaining bits of the Data field of the RLC PDU 240 are padded bits.

The conventional scheme in which the last byte of an RLC SDU is indicated by an LI is efficient in cases where one RLC SDUI is segmented to a plurality of RLC PDUs or a plurality of RLC SDUs are concatenated to one RLC PDU. However, one concrete RLC SDU frequently corresponds to one RLC PDU without any segmentation/concatenation/padding in view of the nature of VoIP packets.

In cases where a 12.2-kbps Adaptive Multi-Rate (AMR) CODEC is widely used in 3GPP, this AMR CODEC creates a 7-byte or 32-byte voice frame every 20 msec. The voice frame is encapsulated with an IP/UDP/RTP header, header-compressed in the PDCP layer, and then delivered to the RLC layer. The compressed header is typically 3 bytes, or occasionally ranges from 4 to 12 bytes.

Consequently, the size of an RLC SDU ranges from 10 to 19 bytes, or from 35 to 44 bytes. This RLC SDU is provided to the RLC layer of the transmitter every 20 msec. The RLC layer reconstructs one concrete RLS SDU to one RLC PDU and sends it on a radio channel. As stated above, since the compressed header is usually 3 bytes in length, most RLC SDUs are 10 or 35 bytes. Accordingly, it is preferable to determine an RLC PDU size such that RLC SDUs of the most frequent size can be efficiently processed.

If the RLC PDU size is defined based on the most frequent RLS SDU size, most of RLS SDUs are framed to RLC PDUs without segmentation/concatenation/padding. In this case, the conventional framing is not efficient.

Figure 3:
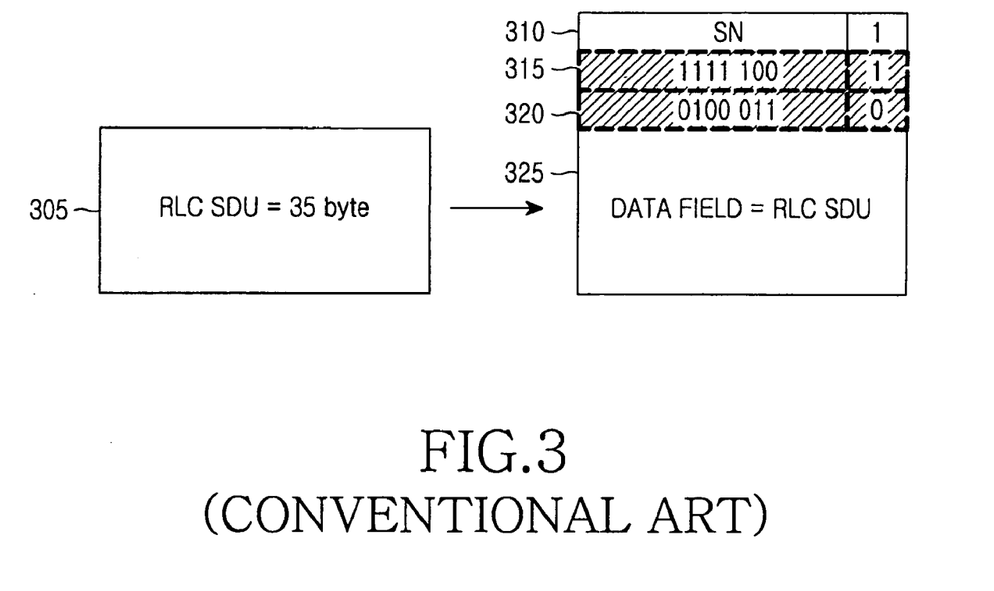
FIG. 3 illustrates a problem encountered with the conventional RLC framing.

FIG. 3 illustrates a problem encountered with the conventional framing.

Referring to FIG. 3, a 35-byte RLC SDU 305 is created and the size of an RLC PDU 310 is 38 bytes. The RLC SDU 305 is framed to one RLC PDU 310. In the RLC PDU 310, a first LI 315 is set to '1111 100' which indicates that the first byte of the RLS SDU 305 corresponds to the first byte of a Data field 325 and a second LI 320 is set to '0100 011' which indicates that the last byte of the RLS SDU 305 corresponds to the 35th byte of the Data field 325. The Data field 325 carries the entire 35-byte RLC SDU 305.

Transmission of the 35-byte is accompanied by a 3-byte overhead, two bytes of which are used for the LI fields.

As described above, compared to typical packet communications, packet data needs to be processed in real time and one RLC SDU is created at every predetermined time interval in VoIP. More specifically, one RLC SDU is converted to one RLC PDU without segmentation or concatenation in VoIP communications. Nonetheless, the conventional RLC framing always requires at least two LI fields, i.e. an LI indicating the start of an RLC SDU and another LI indicating the end of the RLC SDU for an RLC PDU. When necessary, an LI indicating whether a Data field is padded is additionally inserted.

Therefore, the conventional RLC framing leads to inefficient use of limited radio resources in VoIP due to the use of unnecessary LI fields.

Accordingly, there is a need for an improved system and method to efficiently use radio resources.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for efficiently using radio resources by reducing the header size of an RLC PDU in an RLC layer in a mobile communication system supporting packet service.

An exemplary embodiment of the present invention also provides a method and apparatus for segmenting a higher-layer packet into a plurality of RLC PDUs.

According to one aspect of an exemplary embodiment of the present invention, in a method of transmitting data using a pre-defined LI in a mobile communication system, an SDU is received from a higher layer and a determination is made as to whether the SDU can be included in one PDU. If the SDU cannot be included in one PDU, the SDU is segmented into a plurality of segments according to a transmittable PDU size. A plurality of PDUs are constructed, which include the segments in data fields. Each PDU has a header with an SN field, at least one-bit field indicating the presence of an LI field, and the LI field. An LI field of a PDU with an intermediate segment of the SDU in a data field is set to a predetermined value indicating the presence of the intermediate segment. The PDUs are sent to a receiver.

According to another aspect of an exemplary embodiment of the present invention, a PDU is received from a transmitter in a method of receiving data using a pre-defined LI in a mobile communication system. An SN field and a one-bit field indicating the presence or absence of a following LI field are detected from a header of the PDU. If the one-bit field indicates the presence of the LI field, the following LI field is detected from the header of the PDU. A determination is made as to whether the LI field is set to a predetermined value indicating inclusion of an intermediate segment of an SDU in a data field of the PDU. If the LI field is set to the predetermined value, the PDU is stored until the PDU can be assembled with a previous segment and a following segment. The SDU is constructed by combining the intermediate segment from the data field of the PDU with at least one previous segment extracted from a data field of at least one previous PDU and at least one following segment extracted from a data field of at least one following PDU.

According to a further aspect of an exemplary embodiment of the present invention, in an apparatus for transmitting data using a pre-defined LI in a mobile communication system, a transmission buffer receives an SDU from a higher layer, determines whether the SDU can be included in one PDU, and reconstructs the SDU to at least one segment according to a transmittable PDU size. A header inserter constructs at least one PDU including the at least one segment in a data field and including an SN field and a one-bit field in a header. A one-bit field setter sets the one-bit field of the at least one PDU to indicate the presence or an absence of a following LI field. An LI inserter inserts an LI field after the one-bit field in the at least one PDU if the SDU cannot be included in one PDU, and sets an LI field to a predetermined value indicating inclusion of an intermediate segment in a PDU including an intermediate segment of the SDU in a data field. A transmitter sends the at least one PDU received from the LI inserter to a receiver.

According to still another aspect of an exemplary embodiment of the present invention, in an apparatus for receiving data using a pre-defined LI in a mobile communication system, a reception buffer receives a PDU from a transmitter and stores the PDU. A reassembly controller detects an SN field and a one-bit field indicating the presence or absence of a following LI field from a header of the PDU and interprets the following LI field from the header of the PDU, if the one-bit field indicates the presence of the LI field. The reassembly controller also controls the reception buffer to store the PDU until the PDU can be assembled with a previous segment and a following segment, if the LI field is set to a predetermined value indicating inclusion of an intermediate segment of an SDU in a data field of the PDU. If the one-bit field indicates the presence of the LI field, a header and LI remover extracts an intermediate segment from the data field of the PDU by eliminating the SN field, the one-bit field, and the LI field. A reassembler receives the intermediate segment from the header and LI remover and constructing the SDU by combining the intermediate segment with at least one previous segment extracted from a data field of at least one previous PDU and at least one following segment extracted from a data field of at least one following PDU.

Other objects, advantages, and salient features of the invention will become apparent to those skilled in the art from the following detailed description, which, taken in conjunction with the annexed drawings, disclose exemplary embodiments of the invention.

BRIEF DESCRIPTION OF THE DRAWINGS

The above and other exemplary objects, features and advantages of certain exemplary embodiments of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are directed to framing for efficient use of radio resources in a mobile communication system for providing packet service.

An exemplary embodiment of the present invention will be described below in the context of an operation in an RLC layer, particularly an RLC UM operation in a UMTS system, to which the exemplary embodiment of the present invention is not limited. For simplicity, an RLC header is defined to include an SN, the first E, and at least one LI-E pair in an RLC PDU with packet data from a higher layer. That is, the remainder of an RLC PDU, except a Data field, is an RLC header.

In accordance with an exemplary embodiment of the present invention, two kinds of framing are considered. One is that the RLC layer frames an RLC SDU of the most frequent size to an RLC PDU without using any LI, and the other is that the RLC layer frames an RLC SDU of any other size to an RLC PDU or RLC PDUs using an LI field.

The former framing does not use any LI field. It is used in cases where the size of an RLC SDU is equal to that of the Data field of an RLC PDU and thus there is no need for segmentation/concatenation/padding.

The latter framing requires an LI field. It is used in cases where the size of an RLC SDU is different from that of the Data field of an RLC PDU and therefore segmentation/concatenation/padding is needed.

Hence, a different framing scheme may apply to each higher-layer packet. A transmitter notifies a receiver of the framing scheme used for the packet.

In an exemplary embodiment of the present invention, the framing scheme applied to an RLC PDU is indicated by one bit of an RLC header, particularly one bit of the first E field. The first E field is called an F field, to be distinguished from other E fields.

Figure 4:
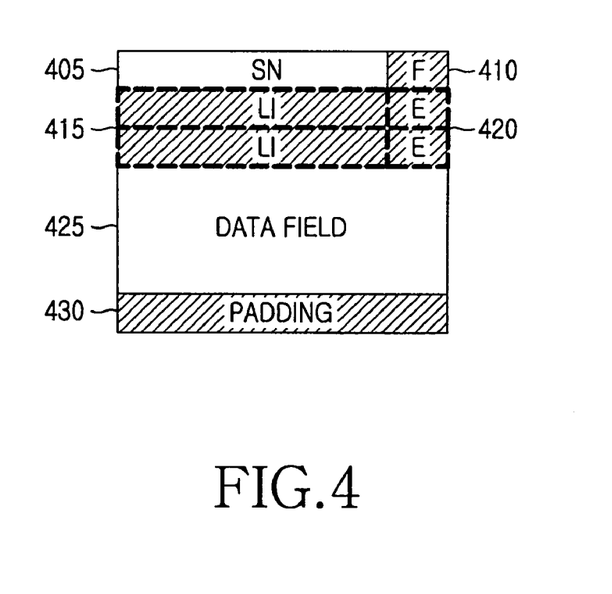
FIG. 4 illustrates the structure of an RLC PDU according to an exemplary embodiment of the present invention.

FIG. 4 illustrates the structure of an RLC PDU according to an exemplary embodiment of the present invention.

Referring to FIG. 4, the RLC PDU includes an SN field 405, an F field 410, an LI field 415, an E field 420, a Data field 425, and a Padding 430. The LI field 415, the E field 420, and the Padding 430 may or may not be included depending on situations. However, the SN field 405, the F field 410, and the Data field 425 always exist. The SN field 405, the LI field 415, the E field 420, the Data field 425, and the Padding 430 may have functionalities analogous to those of a conventional RLC PDU.

The F field 410 indicates a framing scheme used for an RLC PDU, such as the presence or absence of the LI field 415. The F field 410 also indicates whether an RLC SDU has been framed to the RLC PDU 415 without segmentation/concatenation/padding. If the F field 410 is set to '0', the RLC PDU 415 does not have the LI field 415 and the Data field 425 is eventually the one concrete RLC SDU. If the F field 410 is set to '1', the RLC PDU 415 has the LI field 415 and the size of the Data field 425 is not equal to that of the RLC SDU. Thus, the LI field 415 indicates the start or end of the RLC SDU.

Figure 5A:
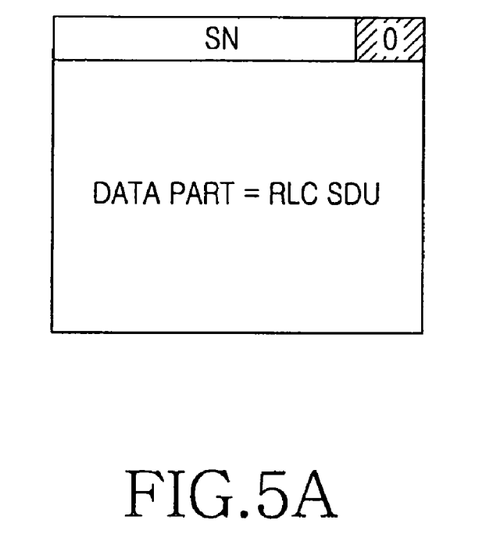
FIG. 5A illustrates the structure of an RLC PDU according to an exemplary embodiment of the present invention, in cases where an RLC SDU corresponds to an RLC PDU without segmentation/concatenation/padding.

FIG. 5A illustrates the structure of an RLC PDU according to an exemplary embodiment of the present invention, in cases where an RLC SDU corresponds to an RLC PDU without segmentation/concatenation/padding.

Referring to FIG. 5A, when a transmitter (an RLC layer in the transmitter) can frame one concrete RLC SDU to one RLC PDU without segmentation/concatenation/padding, it sets the F field to '0' and inserts the RLC SDU in the Data field of the RLC PDU.

If the F field of a received RLC PDU is '0', a receiver extracts the Data field from the RLC PDU, considering that the Data field follows the F field, and provides the Data field as an RLC SDU to the higher layer.

Figure 5B:
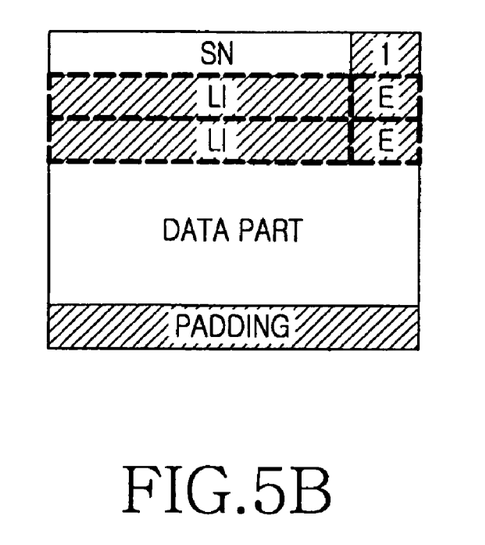
FIG. 5B illustrates the structure of an RLC PDU according to an exemplary embodiment of the present invention, in cases where an RLC SDU is framed to an RLC PDU by segmentation/concatenation/padding.

FIG. 5B illustrates the structure of an RLC PDU according to an exemplary embodiment of the present invention, in cases where an RLC SDU is framed to an RLC PDU by segmentation/concatenation/padding.

Referring to FIG. 5B, when the transmitter needs to perform segmentation/concatenation/padding for RLC framing, it constructs an RLC PDU including an F field set to '1' and LI fields and a Padding field which are needed for segmentation/concatenation/padding.

If the F field of a received RLC PDU is '1', the receiver determines that an LI field and an E field reside in one byte following the F field and reconstructs one or more RLC SDUs out of the Data field of the RLC PDU according to the value of the LI field.

The requirements for using the conventional first E field as an F field are discussed below.

Conventionally, If an RLC PDU comprises a segment of an RLC SDU and the start and the end of the RLC SDU is not included in the RLC PDU, there is no LI in the RLC PDU.

Alternatively, no LI field is used when an RLC SDU is framed to one RLC PDU without segmentation/concatenation/padding. It is necessary to indicate that the RLC PDU does not include one concrete RLC SDU and thus does not include the start or end of the RLC SDU in FIG. 5A.

Figure 6A:
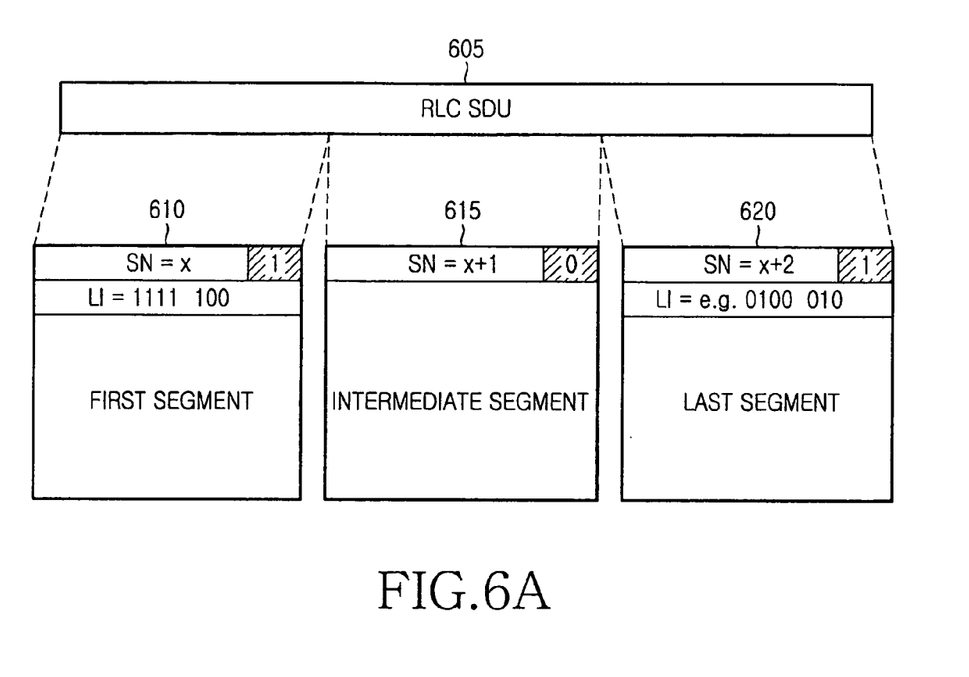
FIG. 6A illustrates segmentation of one RLC SDU into a plurality of RLC PDUs by the conventional RLC framing.

FIG. 6A illustrates segmentation of one RLC SDU into a plurality of RLC PDUs by the conventional RLC framing.

Referring to FIG. 6A, an RLC SDU 605 is segmented into three RLC PDUs 610, 615 and 620 with SN 'x', 'x+1' and 'x+2', respectively. A pre-defined LI value of '1111 100' is inserted in the first RLC PDU 610, thereby indicating that the first byte of the Data field of the RLC PDU 610 corresponds to the first byte of the RLC SDU 605.

Since the start and the end of the RLC SDU 605 are not included in the second RLC PDU 615, the first E field of the second RLC PDU 615 is set to '0' and any LI field not is inserted. An LI value of '0100 010', for example, is inserted in the third RLC PDU 620 in order to indicate that the end of the RLC SDU 605 corresponds to the 34th byte of the Data field of the RLC PDU 620.

Regarding the RLC PDU 615 with no LI field due to the absence of the start or end of the RLC SDU, the receiver cannot determine whether the segment in the Data field of the RLC PDU 615 is one concrete RLC SDU or forms one concrete RLC SDU together with the previous and following RLC PDUs. Therefore, in an exemplary embodiment of the present invention, a novel LI value is defined to indicate an RLC PDU that does not include the start or the end of an RLC SDU (hereinafter, referred to as an intermediate PDU). The novel LI can be '1111 110', for example. An RLC PDU with the novel LI value is considered an intermediate RLC PDU. The Data field of the intermediate RLC PDU includes an RLC SDU segment between the start and end of the RLC SDU.

Figure 6B:
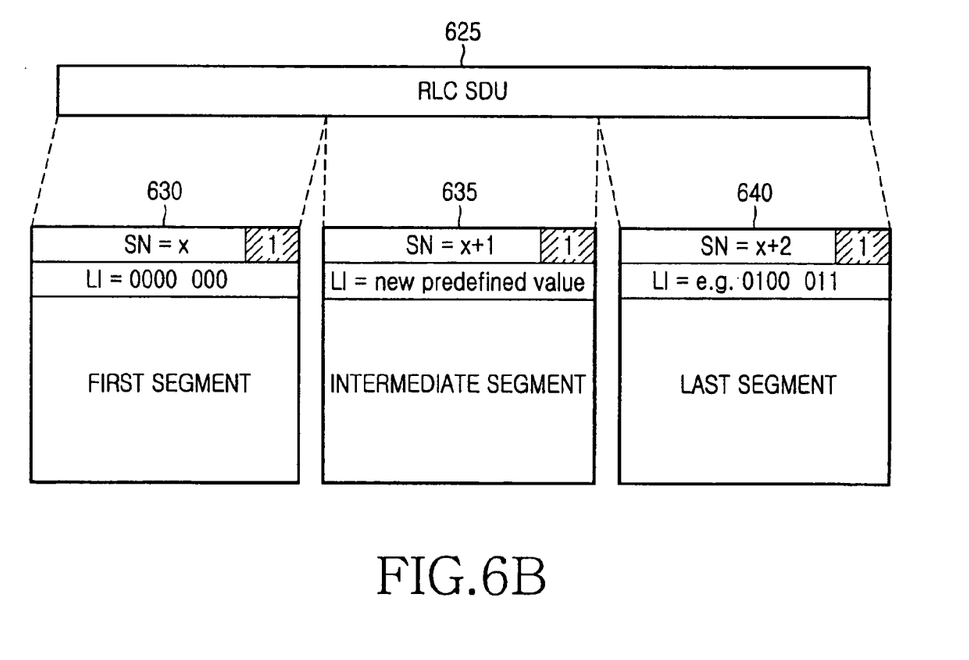
FIG. 6B illustrates segmentation of one RLC SDU into a plurality of RLC PDUs using a new pre-defined LI according to an exemplary embodiment of the present invention.

FIG. 6B illustrates segmentation of one RLC SDU into a plurality of RLC PDUs using a new pre-defined LI according to an exemplary embodiment of the present invention.

Referring to FIG. 6B, an RLC SDU 625 is segmented into three RLC PDUs 630, 635 and 640 with SN 'x', 'x+1' and 'x+2', respectively. The F field is set to '1' and a pre-defined LI value of '1111 100' is inserted in the first RLC PDU 630, thereby indicating that the first byte of the Data field of the RLC PDU 630 corresponds to the first byte of the RLC SDU 625. Since neither the start nor the end of the RLC SDU 625 is included in the second RLC PDU 635, the F field of the second RLC PDU 635 is set to '0' and the new pre-defined LI value of '111 110' is inserted to the second RLC PDU 635, thereby indicating the RLC PDU 635 is an intermediate RLC PDU.

An LI value of '0100 011', for example, is inserted in the third RLC PDU 640 to serve as an indication that the end of the RLC SDU 625 corresponds to the 35th byte of the Data field of the RLC PDU 640.

Now a description will be made of an operation and an apparatus structure according to exemplary embodiments of the present invention. Since concatenation in the RLC layer is beyond the scope of exemplary embodiments of the present invention, an operation and apparatus structure associated with the concatenation will not be described. It is clear that in case of concatenation, if the first E field (i.e. F field) is '1', at least one LI field exists.

Figure 7:
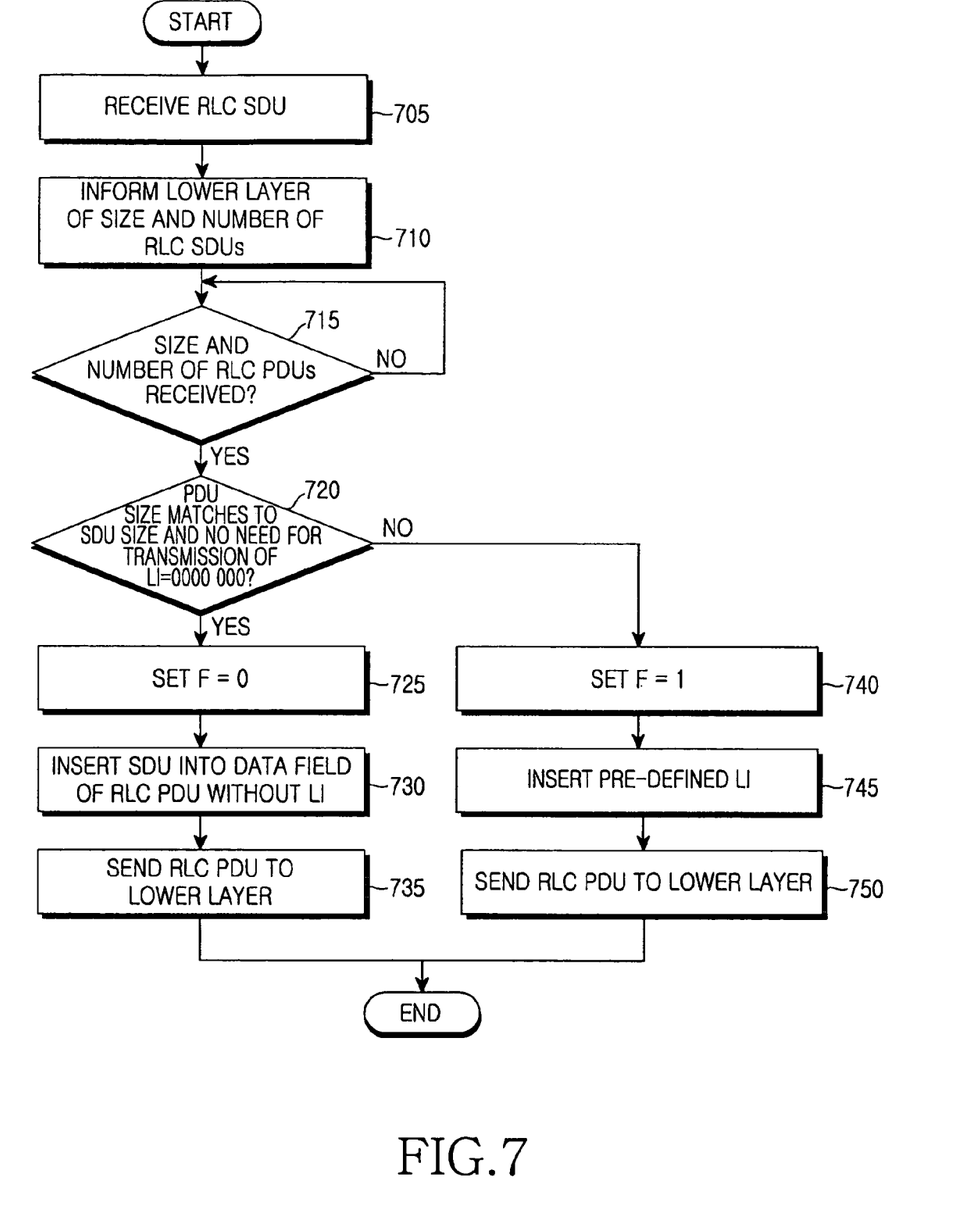
FIG. 7 is a flowchart illustrating an operation for sending an RLC PDU in an RLC layer according to an exemplary embodiment of the present invention.

FIG. 7 is a flowchart illustrating an RLC operation in the transmitter according to an exemplary embodiment of the present invention.

Referring to FIG. 7, upon receipt of at least one RLC SDU from the higher layer in step 705, the RLC layer of the transmitter notifies the lower layer of the number and the size of the at least one RLC SDU in step 710. The lower layer can be the MAC layer. When LI='0000 000' for transmission of the RLC SDU, the RLC layer notifies the lower layer of 'the size of the RLC SDU'+1.

In step 715, the RLC layer waits until the lower layer reports the size and number of RLC PDUs to be transmitted for the next transmission interval. The lower layer determines the most efficient RLC PDU size based on the received RLC SDU information and the radio channel condition for the next transmission interval and notifies the RLC layer of the RLC PDU size.

In step 720, the RLC layer determines whether the notified RLC PDU size matches to the RLC SDU size. At the same time, the RLC layer determines whether LI='0000 000' in a current RLC PDU according to whether the previous RLC PDU has an LI field indicating the last byte of the previous RLC SDU. If the RLC PDU size matches to the RLC SDU size and it is unnecessary to send an LI of '0000 000', the RLC layer goes to step 725. When the sum of the RLC SDU size and a minimum RLC header size is equal or approximate to the RLC PDU size, not greater than the RLC PDU size, it is said that the RLC SDU size matches to the RLC PDU size. In other words, when the first E field (F field) of the RLC PDU is set to '0' and LI fields indicating the start and end of the RLC SDU are not used, the entire RLC SDU is carried in the Data field of the RLC PDU.

LI='0000 000', when the end of the previous RLC PDU perfectly corresponds to the end of the previous RLC SDU and, LI field indicating the end of the previous RLC SDU is not included in the previous RLC PDU.

The RLC layer sets the F field of the current RLC PDU to '0' in step 725, inserts the entire RLC SDU in the Data field of the RLC PDU without including any LI field in step 730, and sends the RLC PDU to the lower layer, for transmission to the receiver in step 735.

Alternatively, if the RLC PDU size does not match to the RLC SDU size or LI='0000 000', the RLC layer sets the F bit of the current RLC PDU to '1' in step 740. In step 745, the RLC layer determines whether there is an intermediate RLC PDU generated from the RLC SDU. When an intermediate RLC PDU exists, the only LI field of the intermediate RLC PDU is set to a novel pre-defined value '1111 110'. The novel pre-defined LI value is set by a system or a designer. In step 750, the RLC layer sends the RLC PDU to the lower layer, for transmission to the receiver.

Figure 8:
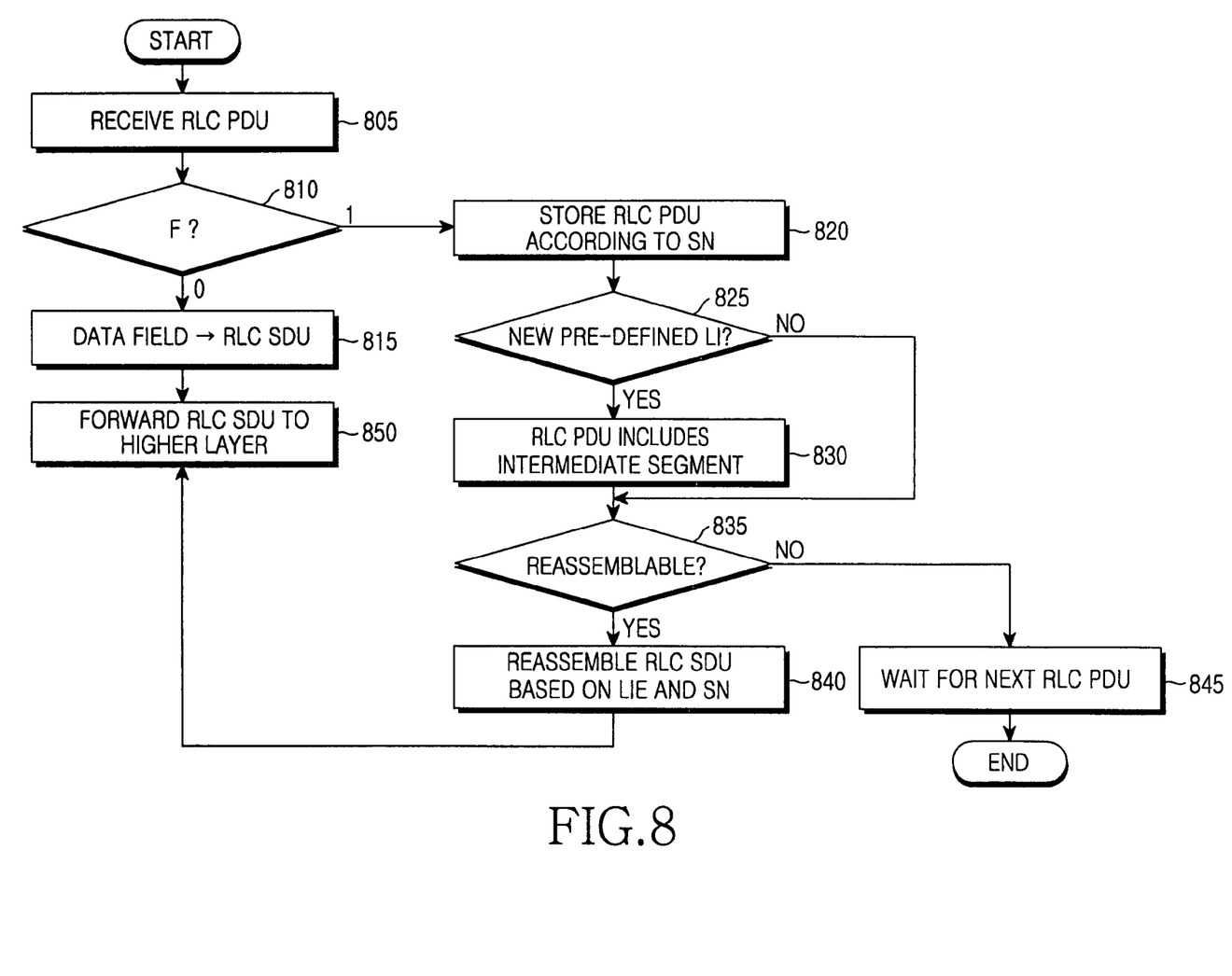
FIG. 8 is a flowchart illustrating an operation for receiving an RLC PDU in the RLC layer according to an exemplary embodiment of the present invention.

FIG. 8 is a flowchart illustrating an RLC operation in the receiver according to an exemplary embodiment of the present invention.

Referring to FIG. 8, the RLC layer of the receiver receives an RLC PDU from the lower layer in step 805 and checks the first E field (F field) of the RLC PDU in step 810. If the F field is '1', the RLC layer goes to step 820. If the F field is '0', the RLC layer proceeds to step 815.

If the F field is '0', this implies that segmentation/concatenation/padding was not applied to the RLC PDU. Thus, the RLC layer eliminates an RLC header (such as SN and F) from the RLC PDU and reconstructs one concrete RLC SDU with the remaining Data field in step 815. The Data field of the RLC PDU becomes one concrete RLC SDU. In step 850, the RLC layer provides the RLC SDU to the higher layer.

If the F field is '1', this implies that segmentation/concatenation/padding was applied to the RLC PDU and at least one LI field exists. In step 820, the RLC layer buffers the RLC PDU according to its SN in a reception buffer.

In step 825, the RLC layer checks to determine whether the first LI field of the RLC PDU is the new pre-defined value '1111 110'. In case of LI='1111 110', the RLC layer goes to step 830. Otherwise, it goes to step 835. The RLC layer determines that the RLC PDU includes an intermediate segment of the RLC SDU in step 830 and determines whether an RLC SDU can be reassembled, such as, recovered by checking the SNs and LIs of RLC PDUs buffered in the reception buffer in step 835. If n RLC PDUs (n is an integer larger than 1) among buffered RLC PDUs with consecutive SNs fulfills the following conditions, the RLC SDU can be reassembled.

Condition 1: The last LI field of the first of the n RLC PDUs indicates the start of a new RLC SDU.

Condition 2: The second to (n−1)th RLC PDUs each include one LI field set to '1111 110'.

Condition 3: The first LI field of the last (such as nth) RLC PDU indicates the position of the last byte of the RLC SDU.

If there are n buffered RLC PDUs fulfilling the above conditions, the RLC layer goes to step 840 and otherwise, it goes to step 845 and waits until a new RLC PDU is received.

The RLC layer reassembles an RLC SDU, referring to the SNs and LIs of the RLC PDUs in step 840 and provides the RLC SDU to the higher layer in step 850.

Figure 9:
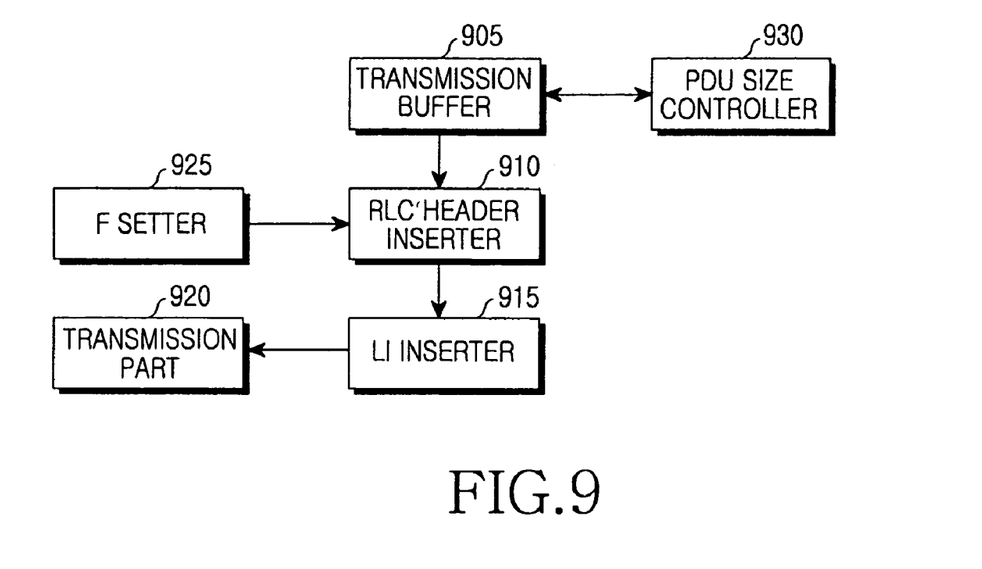
FIG. 9 is a block diagram of a transmitter according to an exemplary embodiment of the present invention.

FIG. 9 is a block diagram of a transmitter acting as a transmitting RLC layer according to an exemplary embodiment of the present invention.

Referring to FIG. 9, the transmitter includes a transmission buffer 905, an RLC header inserter 910, an LI inserter 915, a transmission part 920, an F setter 925, and a PDU size controller 930.

The transmission buffer 905 buffers at least one RLC SDU received from the higher buffer and notifies the PDU size controller 930 of the size and number of the at least one RLC SDU. The PDU size controller 930 determines an RLC PDU size to ensure the highest transmission efficiency and notifies the transmission buffer 905 of the RLC PDU size.

The transmission buffer 905 reconstructs the at least one RLC SDU to the RLC PDU size. If the size of an RLC SDU is equal to that of the Data field of an RLC PDU, the transmission buffer 905 simply provides the RLC SDU to the RLC header inserter 910 without any processing. The F setter 925 controls the RLC header inserter 910 to set the F field of the RLC PDU to '0' if the RLC SDU size is equal to the size of the Data field. The RLC header inserter 910 inserts the F field and an SN into the data received from the transmission buffer 905 under the control of the F setter 925. If the F field is set to '0', the LI inserter 915 does not insert an LI field into the data received from the RLC header inserter 910. Alternatively, if the F field is '1', the LI inserter 915 inserts an LI field. The transmission part 920 sends RLC PDUs created in the above procedure on a radio channel.

Figure 10:
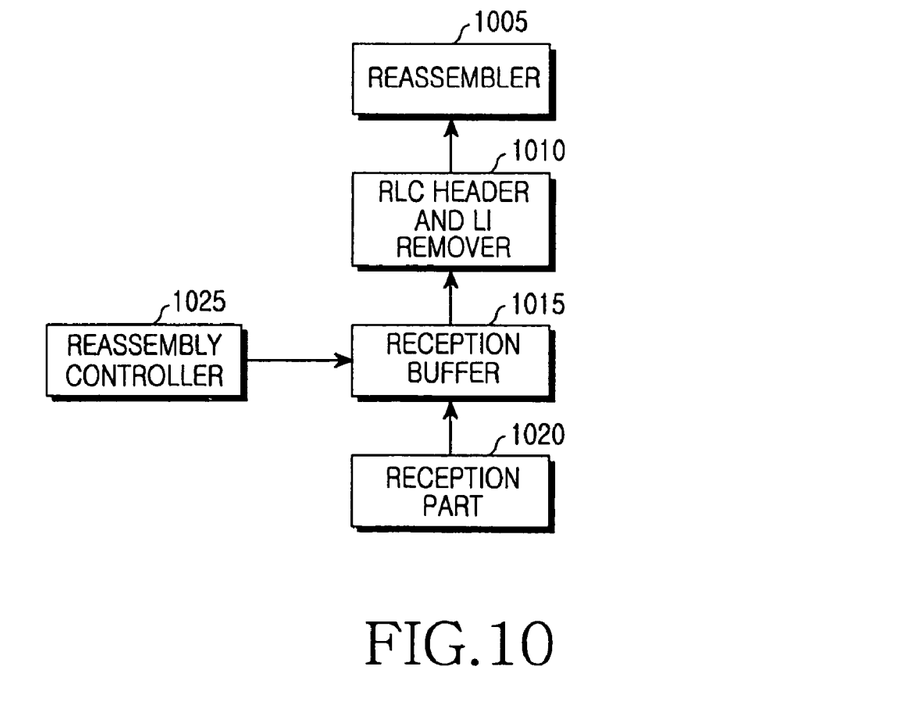
FIG. 10 is a block diagram of a receiver according to an exemplary embodiment of the present invention.

FIG. 10 is a block diagram of a receiver operating as a receiving RLC layer according to an exemplary embodiment of the present invention.

Referring to FIG. 10, the receiver includes a reception part 1020, a reception buffer 1015, an RLC header and LI remover 1010, a reassembler 1005, and a reassembly controller 1025.

The reception part 1020 provides an RLC PDU received from the lower layer to the reception buffer 1015. The reception buffer 1015 buffers the RLC PDU until it is reassembled to an RLC SDU. The reassembly controller 1025 determines whether an RLC SDU assembly is possible by interpreting the Fs and LIs of RLC PDUs buffered in the reception buffer 1015, and controls the reception buffer 1015 to provide an RLC PDU that can be reassembled to the RLC header and LI remover 1010.

The RLC header and LI remover 1010 eliminate an RLC header and an LI (LIs) from the RLC PDU. If the RLC PDU has an F field set to '0', which implies that there is no LI field, only the RLC header is eliminated.

The reassembler 1005 reassembles an RLC SDU using the RLC PDU from which the RLC header and LI(s) are removed and provides the RLC SDU to the higher layer. For an RLC PDU with an F set to '0', the reassembler 1005 constructs one concrete RLC SDU with data extracted form the Data field of the RLC PDU. For an RLC PDU with an F set to '1' and only one LI set to '1111 110', the reassembler 1005 constructs one RLC SDU by combining an intermediate SDU segment extracted from the Data field of the RLC PDU with SDU segments extracted from the previous and following RLC PDUs.

As described above, exemplary embodiments of the present invention facilitate the efficient use of limited radio transmission resources by eliminating the need to insert additional information indicating the start/end/padding of an RLC SDU by use of one-bit information indicating the existence of one concrete RLC SDU in the Data field of an RLC PDU. Since an LI with a new pre-defined value is set in an RLC PDU including only an intermediate segment of the RLC SDU, RLC SDU segmentation is facilitated.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting data in a mobile communication system, comprising:
   receiving a service data unit (SDU) from a higher layer and determining whether the SDU can be comprised in one protocol data unit (PDU);
   if the SDU is not comprised in one PDU, segmenting the SDU into a plurality of segments according to a transmittable PDU size, and constructing one or more PDUs, each PDU comprising a header and a data field,
   wherein the data field comprises a segment of the SDU,
   wherein the header comprises a serial number (SN) field, a one-bit field indicating that the PDU does not contain an entire SDU in the data field and at least one Length Indicator (LI) field,
   wherein if the data field of the PDU contains an intermediate segment of the SDU, the LI field in the PDU contains the intermediate segment of the SDU is set to a predefined value indicating that the PDU contains neither a first segment nor a last segment of the SDU; and
   sending the PDUs to a receiver.

2. The method of claim 1, further comprising the step of, if the SDU is comprised in one PDU, constructing one PDU comprising a header and a data field,
   wherein the header comprises a SN field, and a one-bit field indicating that the PDU contains the entire SDU in the data field.

3. The method of claim 1, further comprising the step of, if a PDU size except the SN field and the one-bit field for a next transmission interval matches to the size of the SDU, determining the PDU size according to the size of the SDU and a radio channel condition, determining that the SDU can be comprised in one PDU.

4. The method of claim 1, wherein LI fields of PDUs comprising the first and last segments of the SDU in data fields are set to values indicating inclusion of the first segment of the SDU and inclusion of the last segment of the SDU.

5. The method of claim 1, wherein the SDU comprises an internet protocol (IP) packet.

6. A method of receiving data in a mobile communication system, comprising:
   receiving a protocol data unit (PDU) from a transmitter and detecting a sequence number (SN) field and a one-bit field indicating whether the PDU contains an entire service data unit (SDU) in its data field from the header;
   if the one-bit field indicates that the PDU does not contain an entire SDU in its data field, detecting the following length indicator (LI) field from the header of the PDU, and determining whether the LI field is set to a value indicating that the PDU contains an intermediate segment that is neither a first segment nor a last segment of the SDU;
   storing the PDU until the PDU can be assembled with a previous segment and a following segment, if the LI field is set to the predefined value; and
   constructing the SDU by combining the intermediate segment from the data field of the PDU with at least one previous segment extracted from a data field of at least one previous PDU and at least one following segment extracted from a data field of at least one following PDU.

7. The method of claim 6, further comprising, if the one-bit field indicates that the PDU contains the entire SDU in its data field, acquiring the entire SDU from the data field of the PDU.

8. The method of claim 6, wherein the storing comprises the steps of storing the PDU in a reception buffer according to the SN field of the PDU.

9. The method of claim 8, wherein the constructing comprises constructing the SDU by combining segments extracted from data fields of a set of PDUs stored in the reception buffer, if the first of the PDUs comprises an LI field indicating inclusion of the first segment of the SDU, if at least one intermediate PDU among the PDUs comprises an LI field set to the value, and if the first LI field of the last of the PDUs indicates the position of the last byte of the SDU.

10. An apparatus for transmitting data in a mobile communication system, comprising:
    a transmission buffer for receiving a service data unit (SDU) from a higher layer, determining whether the SDU can be comprised in one protocol data unit (PDU) segmenting the SDU into a plurality of segments according to a transmittable PDU size if the SDU does not be comprised in one PDU, and constructing one or more PDUs;

a header inserter for constructing a header of each PDU, wherein the header comprises a serial number (SN) field, a one-bit field, at least one Length Indicator (LI) field;

a one-bit field setter for setting the one-bit field of the at least one PDU to indicate whether the PDU contains an entire SDU in the data field;

an LI inserter for inserting an LI field after the one-bit field in the at least one PDU if the SDU is not comprised in one PDU, and setting an LI field to a predefined value indicating that the PDU contains neither a first segment nor a last segment of the SDU to contain the intermediate segment of the SDU; and a transmitter for sending the PDUs to a receiver.

11. The apparatus of claim 10, wherein if the SDU is comprised in one PDU, constructing one PDU comprising a header and a data field, wherein the header comprises a SN field, and a one-bit field indicating that the PDU contains the entire SDU in the data field.

12. The apparatus of claim 10, wherein if a PDU size except the SN field and the one-bit field for a next transmission interval matches to the size of the SDU, the PDU size being determined according to the size of the SDU and a radio channel condition, the transmission buffer determines that the SDU can be comprised in one PDU.

13. The apparatus of claim 10, wherein the LI inserter sets LI fields of PDUs comprising the first and last segments of the SDU in data fields to values indicating inclusion of the first segment of the SDU and inclusion of the last segment of the SDU.

14. The apparatus of claim 10, wherein the SDU comprises an internet protocol (IP) packet.

15. An apparatus for receiving data in a mobile communication system, comprising:

a reception buffer for receiving a protocol data unit (PDU) from a transmitter and storing the PDU;

a reassembly controller for detecting a sequence number (SN) field and a one-bit field indicating whether the PDU contains an entire service data unit (SDU) in its data field from the header, detecting the following length indicator (LI) field from the header of the PDU and determining whether the LI field is set to a predefined value indicating that the PDU contains an intermediate segment that is neither a first segment nor a last segment of the SDU if the one-bit field indicates that the PDU does not contain an entire SDU in its data field;

a header and LI remover for eliminating the SN field, the one-bit field, and the LI field if the one-bit field indicates that the PDU does not contain the entire SDU in its data field,; and a reassembler for receiving the intermediate segment from the header and LI remover and constructing the SDU by combining the intermediate segment with at least one previous segment extracted from a data field of at least one previous PDU and at least one following segment extracted from a data field of at least one following PDU.

16. The apparatus of claim 15, wherein the header and LI remover eliminate the SN field and the one-bit field from the PDU and acquire the entire SDU from the data field of the PDU if the one-bit field indicates that the PDU contains the entire SDU in its data field.

17. The apparatus of claim 15, wherein the reception buffer stores the PDU according to the SN field of the PDU.

18. The apparatus of claim 17, wherein the reassembler constructs the SDU by combining segments extracted from data fields of a set of PDUs stored in the reception buffer, if the first of the PDUs comprises an LI field indicating inclusion of the first segment of the SDU, if at least one intermediate PDU among the PDUs comprises an LI field set to the value, and if the first LI field of the last of the PDUs indicates the position of the last byte of the SDU.

* * * * *